(12) United States Patent
Elaasar et al.

(10) Patent No.: US 8,166,080 B2
(45) Date of Patent: *Apr. 24, 2012

(54) OPTIMIZED COMPUTER DIAGRAMMING METHOD

(75) Inventors: Maged E. Elaasar, Kanata (CA); Michael Hanner, Kanata (CA); Steven R. Shaw, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 617 days.

This patent is subject to a terminal disclaimer.

(21) Appl. No.: 12/236,013

(22) Filed: Sep. 23, 2008

(65) Prior Publication Data

US 2009/0013306 A1     Jan. 8, 2009

Related U.S. Application Data

(63) Continuation of application No. 11/175,748, filed on Jul. 6, 2005, now Pat. No. 7,480,673.

(51) Int. Cl.
*G06F 7/00* (2006.01)

(52) U.S. Cl. ....................................... 707/805

(58) Field of Classification Search .................. 707/784, 707/797, 805
See application file for complete search history.

(56) References Cited

U.S. PATENT DOCUMENTS

| | | | |
|---|---|---|---|
| 5,283,856 A | 2/1994 | Gross et al. | |
| 5,815,415 A | 9/1998 | Bentley et al. | |
| 6,063,128 A | 5/2000 | Bentley et al. | |
| 6,681,383 B1 | 1/2004 | Pastor et al. | |
| 6,714,935 B1 * | 3/2004 | Delo | 707/803 |
| 6,874,146 B1 | 3/2005 | Iyengar | |
| 2002/0038206 A1 | 3/2002 | Dori | |
| 2002/0099559 A1 | 7/2002 | Liu et al. | |
| 2002/0120784 A1 | 8/2002 | Rajarajan et al. | |
| 2003/0163597 A1 * | 8/2003 | Hellman et al. | 709/316 |
| 2005/0041042 A1 | 2/2005 | Rajarajan et al. | |
| 2005/0097146 A1 | 5/2005 | Konstantinou et al. | |
| 2005/0114769 A1 | 5/2005 | Arkhipov et al. | |
| 2006/0161585 A1 | 7/2006 | Clarke et al. | |

\* cited by examiner

*Primary Examiner* — Truong Vo

(74) *Attorney, Agent, or Firm* — Hamilton, Brook, Smith & Reynolds, P.C.

(57) ABSTRACT

A computer method and system of diagramming provide a diagram of a subject model. In response to a primary edit to the subject model, the invention method and system generate a non-persistent view for secondary edits. The diagram is formed of notational elements corresponding to model elements of the subject model. The invention method and system provide a notation meta-model for persisting the notational elements with references to corresponding model elements. The notation meta-model allows notational elements to be recreated and changed dynamically in a manner free of replacing original notational elements.

21 Claims, 4 Drawing Sheets

OPTIMIZED COMPUTER DIAGRAMMING METHOD

CROSS REFERENCE TO RELATED APPLICATION(S)

This application is a continuation of U.S. application Ser. No. 11/175,748, filed Jul. 6, 2005.

The entire teachings of the above application(s) are incorporated herein by reference.

BACKGROUND

Diagrams are graphical representations of some semantic data. They are used to visualize the data in a way that is understandable to the user and also to allow a more intuitive way to modify/edit the semantic data. An example is a UML class diagram. The data that the class diagram is representing can either be java code that is being directly visualized or a model that the user is using for his design activities. To display different aspects of the java code or model, the user may wish to have multiple diagrams. This means there may be more then one notation element representing the same semantic element, and that the notation data may in fact be stored in a separate file to accomplish this.

This causes a number of problems when the project files that people are working on are under a source control system such as CVS or ClearCase. First take the example of a UML model that contains a state machine where a diagram of that state machine exists in a separately source controlled file. If the user adds a composite state inside the state machine through an external API or a tree control explorer (outside of the diagram), then this will cause the diagram to update to create a view of the new state. If the diagram is under source control it will have a prompt for check-out before the view can be added. This is called a "secondary edit" assuming the "primary edit" is the modification of the UML model that owns the state machine. There can be as many of these "secondary edits" as there are diagrams. This poses two problems: first it is cumbersome for the user to manage these check-out requests, and secondly the user may not have access or permissions to make the check-outs. As well, assuming the secondary edits can be performed, the number of files associated with a given activity has increased considerably making it difficult to isolate where the core change or "primary edit" occurred.

A more damaging problem is when the dynamics of team environment are considered. Specifically this is an issue when two or more people edit the model which in turn spawns secondary edits as above in the same resource. When the contributors go to deliver/check-in their work to source control they could encounter conflicts in a file that they didn't directly change themselves that requires merging either through tool assistance or manual edit of the file. Anytime a merge occurs on a file this is an inherently risky procedure that can cause errors or even file corruption.

Even if one considers cases where a source control system is not utilized there can be issues. Since the secondary edits are causing a file change, this usually implies something additional is being stored inside the file. This consequently will increase the file size of those modified resources. Larger files have impact on loading performance and come at a cost of utilized disk space.

In addition, the semantic data graphically represented by a diagram can be a UML model, business data or simply a set of graphical objects used for drawing pictures. The graphical representation data often needs to be persisted separately from the semantic data. The concept of a notation meta-model to persist the graphical representation data with semantic references has been derived from this need. A notation meta-model is a model designed to represent nodes and arcs in different graphical representations. Usually the semantic information is stored completely separately and merely references to the semantic elements are stored in the notation meta-model. A number of implementations for a notation meta-model exist in the market place most notably the new OMG standard for Diagram Interchange.

There are usually three major concerns when designing notation meta-models:

1. The versatility: how easy is it to create instances of a meta-model and change it dynamically?
2. The extensibility: how easy is it to extend the meta-model and how does this extensibility scale?
3. The manageability: How to manage team interaction? How easy is it to manage change events?

Versatility

A lot of the notation meta-models that exist today fail to recognize the difference between a property that is characteristic of the notational element and one that is use-case driven. For example to represent a shape that is laid out in an x-y layout one needs to have a position and a size constraint in the notational element. However, to represent a shape that is laid out in a vertical flow layout one needs an index constraint. One way to solve this problem is to create a shape notational element that contains both kinds of constraints causing redundancy.

Another way is to create an XY-Shape element and an Order-Shape element. The problem with that shows up when the need to change the layout dynamically presents itself. One then needs to create a new element and destroy the old element after copying the unrelated property values.

Along the same lines exist similar problems if there are notation elements with properties related to their semantic reference. If the semantic element changes dynamically, the old notational element needs to be changed into another that has different properties with the same complication of the recreation.

Extensibility

Usually the designers of the meta-model do not anticipate all the use-cases of their model. That is why it is always a good idea to leave room for extension. The problem here is often the choice of the extensibility mechanism. One way to extend a notation element is to inherit it. Unfortunately, this does not work well if the intent of the extension is to remove properties versus add properties.

Another problem is the scalability of this solution. For example, if there are three notation classes that one needs to add a few properties to, one would then extend every one of them to create three derived classes with the new properties. To add more properties later, one needs to again extend off the leaf classes to create more and more classes. Basically, one either has to live with fewer classes that have redundant properties or live with a huge number of classes that represent all the possible combinations. Both cases are not usually acceptable leave alone feasible.

Another idea, adopted by the DI from OMG, is a property map where both the key and the value are strings. The inherent problem with representing all properties as strings is the inefficiency of serialization and de-serialization. It is also particularly inefficient for reference properties since one loses some inherent traceability features (looking up object inter-references). One also loses the ability to make a complex property that encompasses several other properties (a style).

Manageability

Manageability is a major concern for almost all notation meta-model designers. It deals with how to manage events that are generated when a model change occurs, how to manage merge issues when models get touched by different team contributors and so forth. Usually, some fundamental but not very obvious details make all the difference. For example, the assumption that all notational elements are laid out in relative x-y coordinates proves to be a poor one to make. Consider the case where a shape has sub-shapes that are laid out in a flow layout. The key point to that layout is the order of children. If the meta-model persists x-y constraints relative to the container element for each one of the sub-shapes, it needs to update those constraints when the container is resized. This results in two problems: (i) more events to listen and react to in the client code, and (ii) more deltas to detect and analyze in compare and merge (C&M).

Another problem exists if some modeled properties in the notation meta-model are not team oriented but rather specific to the sole user. Examples of such properties are the diagram zoom ratio or its scroll position. These properties usually hold the user preferences and should not be part of the meta-model but rather in a kind of a local preference store. Impact of changing these properties would be unnecessary deltas for user models, which could lead to complications if these models are under source control in a team environment.

BRIEF SUMMARY

Some of the problems described above are due to the necessity to persist the results of a secondary edit, e.g., automatically adding a state view to a state diagram when the state was added outside of the diagram. The solution in a nut-shell is to not persist the changes from the secondary edit. This may sound trivial, but the user must not be aware that the change has not taken place on disk. If the user goes to examine the diagram that is a view on the changed semantics, it should appear to reflect the change just as if the view were persisted to disk. In the above state diagram example, this means the new view has to be somehow separated from the resource of the container. Applicants and the present invention introduce the concept of a non-persisted view element to represent this. The container (diagram) will display and allow interaction with the non-persisted view but it (the non-persistent view) will be ignored when the diagram is saved. When the user goes to modify directly the non-persisted view, it will be transformed into a regular view and consequently persisted with the diagram.

In addition, the notation meta-model proposed by the present invention successfully deals with the meta-model problems outlined above. It allows notational elements to be created and changed dynamically without having to replace them. The two major use cases of change that the present invention addresses are the change of the layout constraint and the change of the semantic reference. It basically allows the notational element to be intact and only those desired aspects change.

The proposed meta-model is also very extensible. Only properties that are fundamental to the notational element characteristics are modeled and the rest are abstracted out into generic slots that can be filled to suit the purpose. A number of these generic slots are introduced at every level of abstraction to avoid redundancy. Extension for basic notational elements is chosen to be by aggregation/composition instead of by inheritance to give the maximum versatility to add and remove properties dynamically.

One other fundamental strength of the meta-model is managing team issues. Properties that are usually touched by a team are modeled in a way to reduce the amount of events and compare and merge deltas that arise from changing them. The rule of thumb is scoping the change to a single slot, and hence a single delta, for most user-change actions. The meta-model also avoids modeling any non-team properties that belong more to a preference store.

In a preferred embodiment, computer method and apparatus for diagramming comprises the computer implemented steps of:

providing a diagram of a subject model, and in response to a primary edit to the subject model, generating a non-persistent view for secondary edits.

The diagram is formed of notational elements corresponding to model elements of the subject model. The invention method/system further provide a notation meta-model for persisting the notational elements with references to corresponding model elements, wherein the notation meta-model allows notational elements to be recreated and changed dynamically in a manner free of replacing original notational elements.

BRIEF DESCRIPTION OF THE SEVERAL VIEWS OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION

A description of preferred embodiments of the invention follows.

There are a number of pre-conditions before a non-persisted view can be used:

(a) All of its attributes can be completely generated based on the semantics it is trying to represent.

(b) Subsequent reincarnations of the non-persisted view will generate the same: i.e. if a diagram is reopened for viewing, the non-persisted view can be regenerated the same as it was viewed previously.

(c) No user gesture in the owned container should be associated with the creation of the non-persisted view since this should indicate that the diagram has changed and thus will be persisted.

The management of these non-persisted views needs to occur externally to the container to create, remove and transform into persisted elements when the conditions are appropriate.

The implementation of a preferred embodiment is based on the following design constraints:
1. A non-persisted (detached) element means that the element is not attached to a model.
2. Children of a non-persisted element are also non-persisted.
3. Attaching a non-persisted element to a model or a persisted element will persist.

In addition, the implementation must support the following three use cases:
1. creating a non-persisted element,
2. persist a non-persisted element, and
3. hide the non-persistence element from clients.

Figure 1:
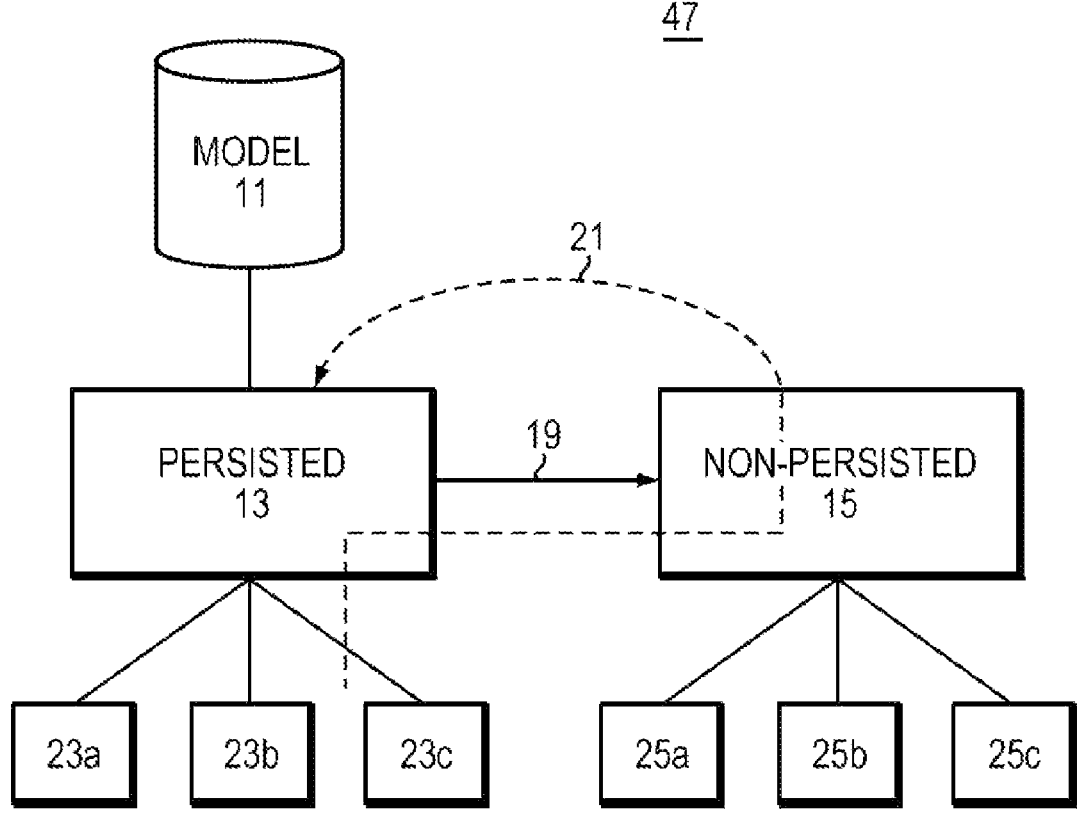
FIG. 1 is a schematic view of the preferred embodiment of the present invention.

The present invention design centers around managing a persisted/non-persisted element map from which the proper container element can be retrieved. Illustrated in FIG. 1 is the basic outline of a persisted model element 11 that contains both persisted and non-persisted elements 13, 15 respectively.

Creating a Non-Persisted Element

A non-persisted element 15, as per the first above-listed design constraint, is simply not attached to a model 11 nor is a child 25 of the non-persistent element 15 attached to a model 11. The first step 19 in creating a non-persisted element 15 is, therefore, to find a non-persisted container for the child element 25 or create one if none is found. Next, the child element 25 is created and added to its non-persisted parent 15.

The following algorithm (program routine 92) outlines the basic steps:

```
Element createNonPersistedElement( Container parent, ChildType
    childType ) {
    Container npParent =
        npContainerMap.findNonPersistedContainer( parent );
    if ( npParent == null ) {
        npParent = createElement( parent.getType( ) );
        npContainerMap.put( parent, npParent );
        npParent.addAnnotation( parent );
    }
    Element child = createElement( childType );
    getChildren(npParent).add( child );
    return child;
}
```

A persisted/non-persisted cache is used to manage the root non-persisted container elements 15 only; there is no need to cache each non-persisted element.

In another embodiment, no persisted/non-persisted cache is used. Instead, annotations hold a reference to an attached element. The annotations are attached to a detached element and allow the persistence manager to quickly find the detached root element and the corresponding attached element. The following illustrates a sample routine/program code 92 for such.

```
Element createNonPersistedElement( Container parent, ChildType
    childType ) {
    EAnnotation annotation =
        parent.getAnnotation(DETACHED_ELEMENT_ID)
    Container container= annotation == null ? null :
        (Container)annotation.getReferences( ).get(0);
    if ( container == null )  {
        EAnnotation annotation =
            createAnnotation(DETACHED_ELEMENT_ID);
        annotation.getReferences( ).add( parent ); //link back to the
    attached element
        container = createElement( parent.getType( ) );
        container .addAnnotation( annotation);
```

```
}
    Element child = createElement( childType );
    container.getChildren( ).add( child );
    return child;
}
```

Persisting a Non-Persisted Element

As per the above-defined design constraints, simply attaching a subject non-persisted element 15 to a persisted element 13 will persist the subject element. The preferred embodiment implementation, therefore, walks up an element's parent hierarchy until it finds a persisted container mapped to a non-persisted container. Once such a persisted container is found, the mapped non-persisted container's children are re-parented to the persisted container. This is illustrated by the dashed or broken line 21 in FIG. 1.

A sample algorithm (program routine 92) for accomplishing these steps 21 is shown below:

```
Persist( Element element ) {
    Element walker = element;
    while ( walker != null
        && npContainerMap.findPersistedContainer(walker) == null ) {
        walker = walker.getParent( );
    }
    if ( walker != null ) {
    // walker it the root non-persisted element
    Container persistedContainer =
        npContainerMap.findPersistedContainer(walker);
    persistedContainer.getChildren( ).add( walker.getChildren( ) );
    }
}
```
or alternatively,
```
Persist( Element element ) {
    Element walker = element;
    EObject root = null;
    if ( isDetachedFromModel(element) ) {
        while (walker != null ) {
                root = walker;
                walker = walker.eContainer( );
        }
        if ( root != null ) {
        EAnnotation annotation =
            root.getAnnotation(DETACHED_ELEMENT_ID)
        Container container =
            (Container)annotation.getReferences( ).get(0);
        if ( container != null ) {
                container.getChildren( ).addAll( root.getChildren( ) );
        }
    }
    }
}
```

Hiding the Non-Persisted Element from Clients

When an element returns its children, it should return both the persisted 23 and non-persisted children 25. That is, the calling client should not have to know that an element may contain one or more detached elements. In general, this is not at issue; the container element would simply return its children. An element registered in the non-persisted container cache or detached element, however, must return both its non-persisted and persisted children 25, 23. This is accomplished through a utility methods 92 as follows:

```
List getChildren( Container container )  {
    If (npContainerMap.contains(container) )  {
    List children = new List( );
```

-continued

```
        children.add(npContainerMap.findPersistedContainer(container).
        getChildren( ))
        children.add(npContainerMap.findNonPersistedContainer-
        (container)
        .getChildren( ))
        return children;
        }
        return container.getChildren( );
or alternatively
        List getChildren( Container parent )  {
        EAnnotation annotation =
        parent.getAnnotation(DETACHED_ELEMENT_ID)
        Container container= annotation == null ? null :
(Container)annotation.getReferences( ).get(0);
        if ( container != null ) {
        List list = new ArrayList( );
        list.addAll( container.getChildren( ) );
        list.addAll( parent.getChildren( ) );
        return list;
        }
        return parent.getChildren( );
        }
```

A view generator 47 of the present invention operates according to the above methods/program routines 92 to generate a non-persistent view for secondary edits in response to primary edits to a subject model 11 being diagrammed. Upon a user modifying directly the non-persisted view, view generator 47 transforms that view into a regular view which persists with the corresponding diagram.

View

Figure 2:
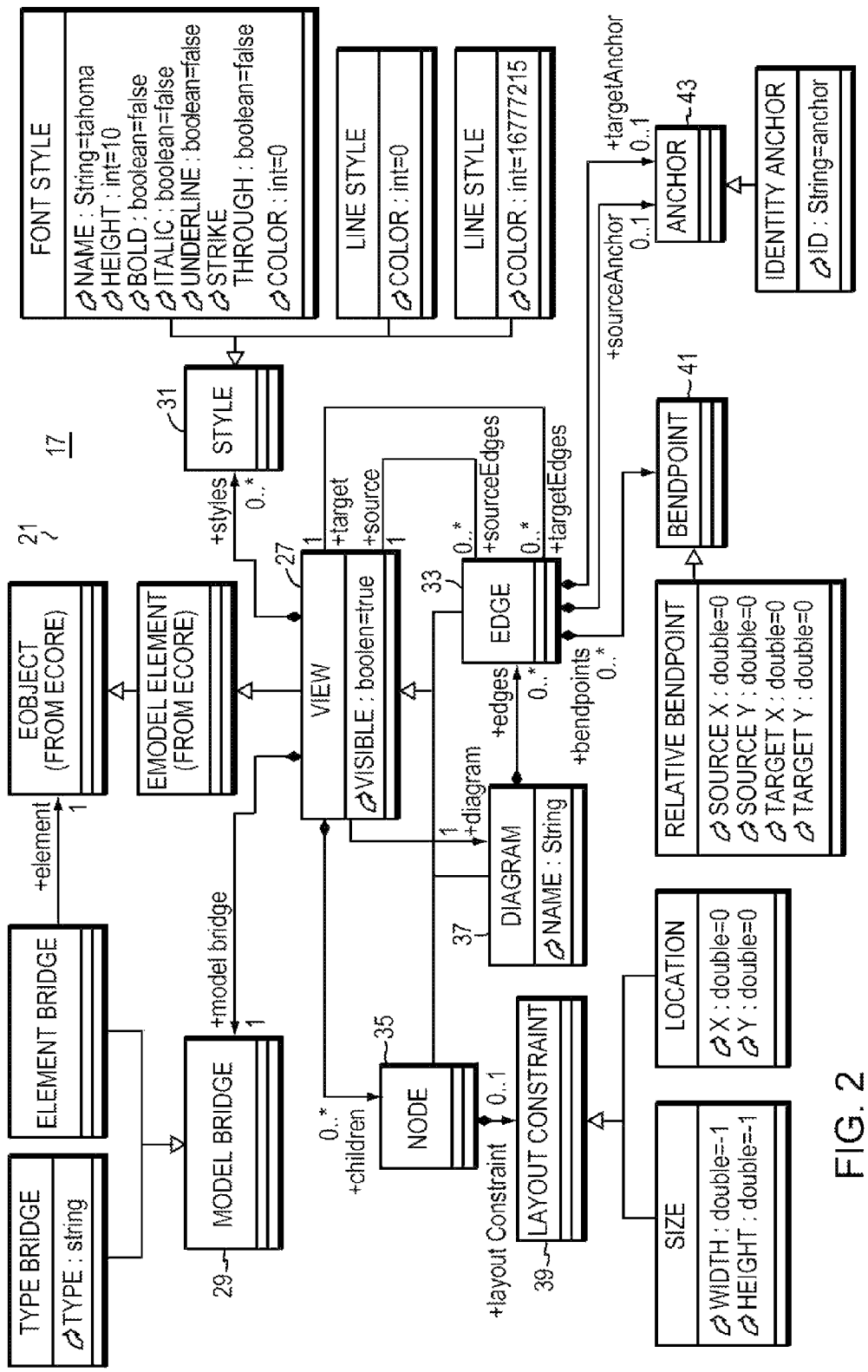
FIG. 2 is a design diagram of another embodiment.

Turning now to FIG. 2, the design of the invention notation meta-model 17 revolves around the idea of a view 27 (producible by view generator 47 of FIG. 1). A view 27 is a fundamental notational element that has a reference to some semantic model through a model bridge slot 29. A model bridge 29 is an abstract concept that can be realized by containing any thing from a reference to a semantic element to a simple semantic string.

The view 27 also has a collection of styles 31. A style 31 is an element containing a group of properties. The styles 31 can be composed/aggregated in the view. The choice of styles 31 to install corresponds usually to the kind of semantics implied by the model bridge 29. The original designer of a notational element can choose to install a collection of styles 31 to satisfy his immediate needs. Other designers extending his view 27 can add, delete or replace styles 31 as they wish. Also at run-time, if the model bridge 29 changes, the collection of styles 31 can also change dynamically by losing or gaining some styles 31 without having to destroy the whole view 27 and creating a new one after copying all the slots that have not changed.

All views 27 are connectable; this means they could be the source or target of an edge 33. They can also have children that are node views 35. Three fundamental kinds of views are identified: a node 35, an edge 33 and a diagram 37.

Node

A node 35 is a hierarchical view that is owned and laid out by its container view. Therefore, a distinguishing property of a node 35 is its layout constraint property 39. The property is abstract and can be realized by any type of layout constraint 39 like position and size. The choice of model with the layout constraint 39 separate from the node 35 makes the change of a parent's layout and hence the child's layout constraint much easier. Otherwise again, a view 27 (which is usually heavier) has to be destroyed and another created just to do that. Another advantage is to give flexibility for the designer to choose a suitable constraint for the container view and not to have to be stuck with XY constraints.

Edge

An edge 33 is an arch in a diagram that connects two other views 27. Therefore, it has a source and a target view 27. Since edges 33 are not hierarchical, it is challenging to decide where to store them. However, the choice made could have severe C&M implications. Storing the edge 33 in either the source's or the target's list of children will generate unnecessary deltas if the owning end changes. The end change delta is the required one to have, not the parent view one. In addition, storing edges 33 and nodes 35 in the same children collection can have sever impact on reading the node children since edges 33 have to be filtered out and on reading edges 33 since nodes 35 have to be filtered out. This could also have C&M impact since the collection of children is usually ordered but connectors are usually unordered which could lead to undesired deltas. In the present invention model 17, edges 33 are stored in a special unordered collection within the diagram. This way, it is easier to manage them. If their ends change, the deltas are just a matter of a source or target view change rather than also having to deal with structural deltas.

Edges 33 can have a list of bend points 41. Since many applications deal with bend points differently, the concept was left abstract. It may be realized in a number of different ways one of which is two relative distances from the source and target views. This particular choice proves to be a team friendly one. Since moving source and target view 27 often results in moving edges 33 and hence their bend points 41, storing them as relative distances from the two ends means there are no deltas for this kind of change.

An edge 33 also has two optional anchors 43 at the source and the target. Again, since it is application specific to model the best type of anchor 43 to minimize C&M delta, the concept is left abstract. For most applications, a simple anchor 43 with an id will do. However, for some complex applications like sequence diagrams, anchors 43 could contain relative positions and therefore an id is just not enough.

Diagram

A diagram 37 is the root of containment for the notational model 17. All views 27 exist in the context of some diagram 37. A typical property of a diagram 37 is its name. Many notational meta-models include some properties like zoom factor and view-port position as core properties of diagrams 37, but these are usually workspace related concepts. However, if these and others are decided by the application to be team properties, they can still be modeled using styles.

Figure 3:
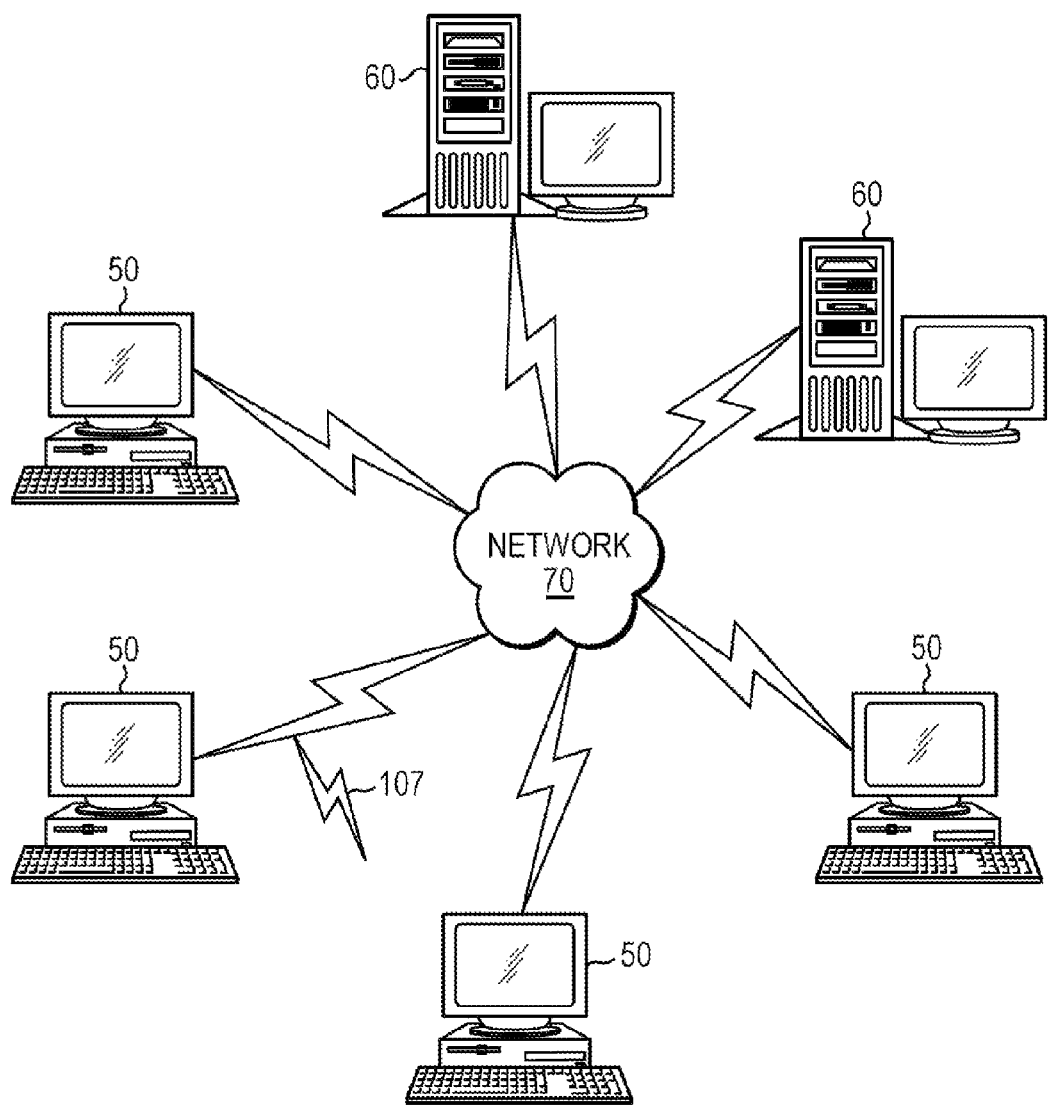
FIG. 3 is a schematic view of a computer environment in which the principles of the present invention may be implemented.

FIG. 3 illustrates a computer network or similar digital processing environment in which the present invention may be implemented.

Client computer(s)/devices 50 and server computer(s) 60 provide processing, storage, and input/output devices executing application programs and the like. Client computer(s)/devices 50 can also be linked through communications network 70 to other computing devices, including other client devices/processes 50 and server computer(s) 60. Communications network 70 can be part of a remote access network, a global network (e.g., the Internet), a worldwide collection of computers, Local area or Wide area networks, and gateways that currently use respective protocols (TCP/IP, Bluetooth, etc.) to communicate with one another. Other electronic device/computer network architectures are suitable.

Figure 4:
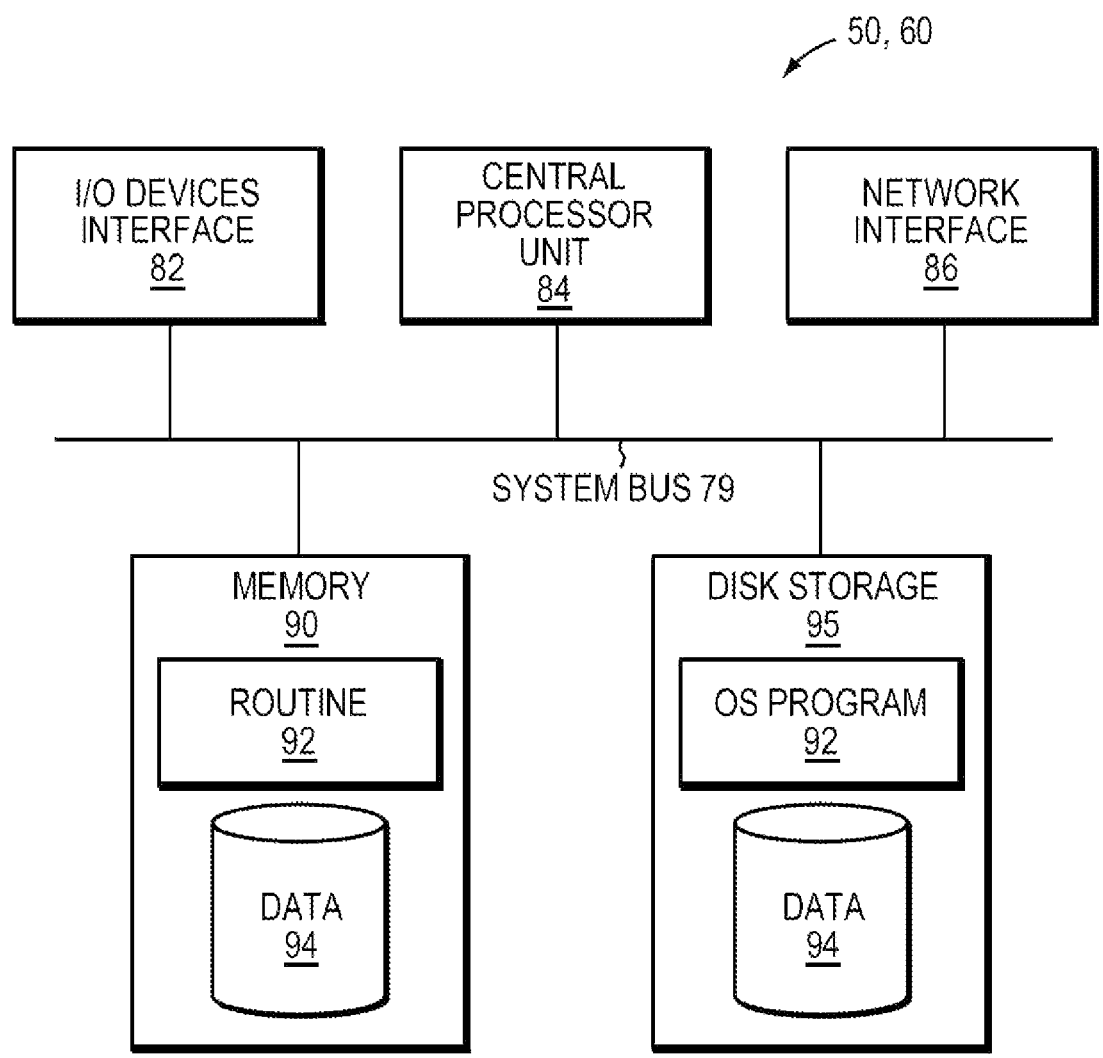
FIG. 4 is a block diagram of the internal structure of a computer from the FIG. 3 computer environment.

FIG. 4 is a diagram of the internal structure of a computer (e.g., client processor/device 50 or server computers 60) in the computer system of FIG. 3. Each computer 50, 60 contains system bus 79, where a bus is a set of hardware lines used for data transfer among the components of a computer or processing system. Bus 79 is essentially a shared conduit that connects different elements of a computer system (e.g., processor, disk storage, memory, input/output ports, network ports, etc.) that enables the transfer of information between the elements. Attached to system bus 79 is I/O device interface 82 for connecting various input and output devices (e.g., keyboard, mouse, displays, printers, speakers, etc.) to the computer 50, 60. Network interface 86 allows the computer to connect to various other devices attached to a network (e.g., network 70 of FIG. 3). Memory 90 provides volatile storage for computer software instructions 92 and data 94 used to implement an embodiment of the present invention (e.g., subject model 11, persistent elements 13, non-persistent elements 15, view generator 47, notation meta-model 17 and method steps 19, 21 and other supporting program code/routines detailed and exemplified above). Disk storage 95 provides non-volatile storage for computer software instructions 92 and data 94 used to implement an embodiment of the present invention. Central processor unit 84 is also attached to system bus 79 and provides for the execution of computer instructions.

In one embodiment, the processor routines 92 and data 94 are a computer program product (generally referenced 92), including a computer readable medium (e.g., a removable storage medium such as one or more DVD-ROM's, CD-ROM's, diskettes, tapes, etc.) that provides at least a portion of the software instructions for the invention system. Computer program product 92 can be installed by any suitable software installation procedure, as is well known in the art. In another embodiment, at least a portion of the software instructions may also be downloaded over a cable, communication and/or wireless connection. In other embodiments, the invention programs are a computer program propagated signal product 107 embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions for the present invention routines/program 92.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 92 is a propagation medium that the computer system 50 may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals, propagated medium, storage medium and the like.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

While this invention has been particularly shown and described with references to preferred embodiments thereof, it will be understood by those skilled in the art that various changes in form and details may be made therein without departing from the scope of the invention encompassed by the appended claims.

For example, the present invention provides a system and method for optimizing diagram persistence. The invention provides a non-persistent view element which allows a container (diagram) to be displayed and allows interaction with the non-persisted view but will be ignored when the diagram is saved. When the user goes to modify directly the non-persisted view, it is transformed into a regular view and consequently persisted with the diagram. The management of these non-persisted views needs to occur externally to the container to create, remove and transform it into persisted elements when the conditions are appropriate. In other areas of the computer related and software arts, there are mechanisms that add data to a data store without modifying the original data store. However, the present invention is not directed to/focused on database systems or the ability to add data ("attributes") to a database without modifying the original database table. These attributes are not part of the original database schema; however, other mechanisms allow these attributes to be integrated into the in-memory database representation for query purposes only. This data is volatile and as a result not saved back into the original database. Persisting the volatile data is possible but requires a database schema change or a second database specifically designed for the added attributes.

The present invention significantly differs from the above database mechanism in several ways:

1. The present invention is not dependent on the underlying persistence mechanism (file system, database, . . . ),
2. The detached/non-persistent data are not volatile, and
3. The detached/non-persistent data are not "additional" attributes; i.e., in database terminology, these attributes are part of the database schema.

In the present invention, detached diagram elements are integrated into the in-memory representation of the diagram model. These detached elements are not persisted when the diagram is saved. However, if the user modifies these detached elements, the element is inserted into the in-memory diagram model and, as a result, will be persisted when the diagram is saved.

Further, the present invention provides a diagram persistence model for team interaction. The persistence model (meta-model) allows notational elements to be created and changed dynamically without having to replace them. Two cases of changes addressed by the invention include the change of layout constraint and the change of the semantic reference. The invention allows the element to be intact and only those aspects change. Further the invention meta-model is also extensible. Only properties that are fundamental to the notation element characteristics are modeled and the rest are extracted out into generic slots that can be filled to suit the purpose. A number of these generic slots are introduced at every level of abstraction to avoid redundancy. Extension for basic notational elements is chosen to be aggregation/composition instead of by inheritance to give the maximum versatility to add and remove properties dynamically. Thus the present invention focuses on design of interfaces and in particular the design choices and how they can affect extensibility, efficiency, etc.

Accordingly, the present invention describes a notation meta-model, a set of interfaces and implementations that are carefully designed for team interaction and for general minimal impact extensibility and editing. For instance, the foregoing described 'style' is a dynamic (run time) way to extend an element by aggregation rather than a static schema-based way like an auxiliary data (e.g., clear definitions and the like). In addition, the invention focuses on a team efficient notation meta-model in which many practical problems related to notations are addressed.

What is claimed is:

1. A computer system for diagramming comprising:
a computer generated diagram graphically representing a subject model, the subject model having model elements and the diagram being formed of notational elements corresponding to the model elements of the subject model; and
a view generator responsive to primary edits to the subject model, the view generator generating a non-persistent view representative of the primary edit for secondary edits to the diagram, the non-persistent view being contained in a non-persistent container element, that is associated with but detached from a persistent container element of the diagram, and the view generator generating the non-persistent view in a manner such that the diagram and the non-persistent view are displayed to a user as if the non-persistent view were a persistent part of the diagram by displaying both attributes of the persistent and non-persistent container elements of the diagram;
wherein a notation meta-model persists the notational elements with references to the corresponding model elements, the notation meta-model allowing notational elements to be recreated and changed dynamically in a manner free of replacing original notational elements in the diagram by mapping from which persistent and non-persistent container elements to retrieve said attributes, and wherein mapping the attributes of the non-persistent container element to the persistent container element transforms the non-persistent view into a persistent view persisting with the diagram.

2. A computer system as claimed in claim 1 wherein the non-persistent view is ignored when the diagram is subsequently saved if the displayed non-persistent view is not edited by the user.

3. A computer system as claimed in claim 1 wherein in response to the user directly modifying the displayed non-persistent view, the view generator transforming the non-persistent view into a persistent view that persists with the diagram by assigning the attributes of the non-persistent container element to the persistent container element.

4. A computer system as claimed in claim 1 wherein the notation meta-model provides extension of a notational element by aggregation or composition instead of by inheritance.

5. A computer system as claimed in claim 1 wherein for each notational element, the notation meta-model (i) models only properties that are fundamental to characteristics of the notational element, and (ii) provides generic slots for abstracting other properties of the notational element.

6. A computer system as claimed in claim 5 wherein the notation meta-model enables properties of the notational elements to be dynamically added and removed.

7. A computer system as claimed in claim 5 wherein the notation meta-model avoids modeling non-team properties in favor of holding those properties in a preference store.

8. A computer system as claimed in claim 5 wherein the notation meta-model models properties substantially used by a team, said modeling being in a manner that reduces amount of compare and merge deltas which arise from changes to said properties.

9. A computer system as claimed in claim 1 wherein the diagram is a state diagram of a state machine with the subject model and the primary edit is addition of a new state; and
the view generator generates the non-persistent view instead of automatically adding a state view corresponding to the new state.

10. A computer program product comprising:
a non-transitory computer readable storage medium having computer usable program code encoded thereon for diagramming, including instructions which when executed on a computer, cause the computer to:
generate a diagram graphically representing a subject model, the subject model having model elements and the diagram being formed of notational elements corresponding to the model elements of the subject model; and
in response to a primary edit to the subject model, generate a non-persistent view representative of the primary edit for secondary edits to the diagram, the non-persistent view being contained in a non-persistent container element, that is associated with but detached from a persistent container element of the diagram, said generating including displaying the diagram and the non-persistent view to a user as if the non-persistent view were a persistent part of the diagram by displaying both attributes of the persistent and non-persistent container elements of the diagram;
wherein a notation meta-model persists the notational elements with references to the corresponding model elements, the notation meta-model allowing notational elements to be recreated and changed dynamically in a manner free of replacing original notational elements in the diagram by mapping from which persistent and non-persistent container elements to retrieve said attributes, and wherein mapping attributes of the non-persistent container element to the persistent container element transforms the non-persistent view into a persistent view persisting with the diagram.

11. The computer program product as claimed in claim 10 wherein the non-persistent view is ignored when the diagram is subsequently saved if the displayed non-persistent view is not edited by the user.

12. The computer program product as claimed in claim 10 further comprising instruction that causes the computer to:
in response to a user directly modifying the displayed non-persistent view, transform the non-persistent view into a persistent view that persists with the diagram by assigning the attributes of the non-persistent container element to the persistent container element.

13. The computer program product as claimed in claim 10 wherein the notation meta-model provides extension of a notational element by aggregation or composition instead of by inheritance.

14. The computer program product as claimed in claim 10 wherein for each notational element, the notation meta-model (i) models only properties that are fundamental to characteristics of the notational element, and (ii) provides generic slots for abstracting other properties of the notational element.

15. The computer program product as claimed in claim 14 wherein the notation meta-model enables properties of the notational elements to be dynamically added and removed.

16. The computer program product as claimed in claim 14 wherein the notation meta-model avoids modeling non-team properties in favor of holding those properties in a preference store.

17. The computer program product as claimed in claim 14 wherein the notation meta-model models properties substantially used by a team, said modeling being in a manner that reduces amount of compare and merge deltas which arise from changes to said properties.

18. The computer program product as claimed in claim 10 wherein the diagram is a state diagram of a state machine with the subject model and the primary edit is addition of a new state; and
the step of generating generates the non-persistent view instead of automatically adding a state view corresponding to the new state.

19. A computer method of diagramming comprising computer implemented steps of:
providing a diagram of a subject model, the subject model being semantic data and having model elements, and the diagram being a graphical representation of the semantic data and the diagram being formed of notational elements corresponding to the model elements of the subject model;
in response to a primary edit to the subject model, generating a non-persistent view representative of the primary edit for secondary edits to the diagram, the non-persistent view being contained in an non-persistent container element that is associated with but detached from a persistent container element of the diagram; and
upon a user viewing the diagram, displaying the diagram and the non-persistent view to the user as if the non-persistent view were a persistent part of the diagram by displaying both attributes of the persistent and non-persistent container elements of the diagram;
wherein a notation meta-model persists the notational elements with references to the corresponding model elements, the notation meta-model allowing notational elements to be recreated and changed dynamically in a manner free of replacing original notational elements in the diagram by mapping from which persistent and non-persistent container elements to retrieve said attributes, and wherein mapping attributes of the non-persistent container element to the persistent container element transforms the non-persistent view into a persistent view persisting with the diagram.

20. A method as claimed in claim 19 wherein the non-persistent view is ignored when the diagram is subsequently saved if the displayed non-persistent view is not edited by the user.

21. A method as claimed in claim 19 further comprising the step of:
in response to a the user directly modifying the displayed non-persistent view, transforming the non-persistent view into a persistent view that persists with the diagram by assigning the attributes of the non-persistent container element to the persistent container element.

* * * * *